United States Patent

[11] 3,603,945

[72] Inventor Friedrich R. Hertrich
Boulder, Colo.
[21] Appl. No. 817,829
[22] Filed Apr. 21, 1969
[45] Patented Sept. 7, 1971
[73] Assignee International Business Machines Corporation
Armonk, N.Y.

[54] SIGNAL RECOVERY SYSTEM UTILIZING AMPLITUDE COMPARISON AT THE BEGINNING AND END OF A BIT PERIOD
9 Claims, 3 Drawing Figs.

[52] U.S. Cl. .......... 340/174.1 H, 340/174.1 F
[51] Int. Cl. .......... G11b 5/04
[50] Field of Search .......... 340/174.1 F, 174.1 H

[56] References Cited
UNITED STATES PATENTS

| | | | |
|---|---|---|---|
| 2,896,192 | 7/1959 | Husman | 340/174.1 |
| 3,218,618 | 11/1965 | Warren | 340/174.1 |
| 3,518,648 | 6/1970 | Norris | 340/174.1 |

*Primary Examiner*—Bernard Konick
*Assistant Examiner*—J. Russell Goudeau
*Attorneys*—Hanifin and Jancin and Herbert F. Somermeyer ABSTRACT: Readback signals from a magnetic media are characterized by having signal components respectively with a frequency F and a double frequency 2F with shifts between such signal components indicating recorded data. Usually, the lower or F frequency signal component has a greater amplitude than the 2F frequency signal. In the recording of binary digital data, a bit period of recording is defined as equal to the wavelength of the 2F signal component. Higher frequency harmonics may be used as the high frequency component wherein the bit period is an integral number of wavelengths of such higher frequency signal component. For data signal recovery, the signal amplitude at the beginning of a given bit period is compared with the signal amplitude at the end of such bit period. If the amplitude comparison shows a substantial difference in amplitude, then the first signal component is indicated; whereas, if the amplitudes are substantially similar, the second or higher frequency signal component is indicated.

INVENTOR
FRIEDRICH R. HERTRICH

BY Herbert F. Somermeyer

ATTORNEY

SIGNAL RECOVERY SYSTEM UTILIZING AMPLITUDE COMPARISON AT THE BEGINNING AND END OF A BIT PERIOD

BACKGROUND THE INVENTION

This invention relates generally to magnetic recording and, more particularly, to improvements in the recovery of recorded signals from a magnetic media having a relative motion with respect to a sensing transducer.

Magnetic recording systems storing digital data are used extensively with electronic data processing equipments, communications equipments, and the like. In a continuing effort to improve performance capabilities of such magnetic recording systems (magnetic discs, tapes, drums, and the like), there has been an exerted effort to increase the recording densities of such systems for reducing access time and processing time in the system. It is desired that the bit packing density (i.e., the number of bits or digits recordable on a lineal inch on the magnetic recording media) is desired to be as large as possible. At the present time, high density recording is considered to be the area from 6,000 to 10,000 bits recorded per lineal inch of magnetic media. As technology develops, the definition of high density magnetic recording will, of course, increase. The width of each recording track varies with system design.

Readback of a magnetic recording is accomplished by amplifying the small amplitude signals induced in a magnetic reproducing or read head as the magnetic media moves past the latter. In some systems, the reproducing head is moved and the media is static. As the recording density is increased, the amplitude of the signals supplied by the readback head have a tendency to decrease; thereby increasing the difficulty of faithfully reproducing recorded digital data. Most reproducing heads are pronouncedly bandwidth limited such that higher frequency signals in the recording system are attenuated. Other operational difficulties later referred to are also encountered.

Digital data recorded on a magnetic media is represented either as a change in magnetic flux, the polarity of such magnetic flux, or as different frequencies of changing magnetic flux in a given predetermined area of the media often referred to as a "bit cell" or "cell." The duration of time for a transducer to scan one cell is usually termed a "bit period." Timing in digital recording systems is usually centered around such bit periods. In RZ (return to zero) and NRZ (nonreturn to zero) recordings, binary digital data is recorded as a given polarity of magnetic remanence in the magnetic media. A positive magnetic remanence may represent a binary "1" while a negative magnetic remanence may represent a binary "0." As the recording bit density increases, there is a merging or fringing of the magnetization into adjacent bit cells. For recorded alternate "1's" and "0's," such merging results in a sharp demarcation between adjacently recorded signals. Such sharp demarcation results in a high rate of change of magnetic flux ($d\Phi/dt$) in the magnetic reproducing head resulting in a large readback signal being supplied by the reproducing transducer. However, when the series of "1's" or a series of "0's" are recorded, such merging or fringing reduces the magnitude in magnetic flux in adjacent recording areas and thereby reduces the $d\Phi/dt$ resulting in smaller amplitude readback signals being supplied from the reproducing transducer. As a result, difficulty of detecting a string of "1's" or a string of "0's" is substantially increased.

In another recording scheme called NRZI, a change in magnetic flux polarity occurs in a bit cell each time a binary "1" occurs. For a binary "0," there is no change in magnetic flux polarity in a given bit cell. High density problems with NRZI include obtaining reliable clocking information when a string of 0's are recorded. An attempt to improve the NRZI is the "synced" (synchronized) NRZI in which a change of flux is required to occur every given number of bit cells. Synced NRZI requires more detection circuitry to keep track of the sync pulses as opposed to reporting a recovered binary 1.

Other systems of magnetic recording include frequency modulation schemes, wherein a binary 0 is represented by a first frequency of flux reversals, and a binary 1 is represented by a second frequency of flux reversals. Such systems may also be referred to as a bifrequency recording system. Generally, in such systems, a binary 1 has been represented by a signal of twice or harmonically related frequency of a binary 0 or a base frequency F. A somewhat related recording system is phase encoded recording wherein a binary 1 is represented by flux reversals having a first phase and a binary 0 is represented by flux reversals having an opposite phase; the flux reversal frequencies are the same. However, when there is a change in phase (i.e., alternate binary 1's and 0's are recorded), there is introduced a lower frequency in the readback signal.

Therefore, the readback signal in the phase encoded recording would have a low frequency F (for example) representing a change in phase and a higher frequency harmonically related to the phase change frequency wherein the higher frequency may be 2F wherein a bit cell is defined by one or more integral periods thereof. Some phase encoded recording systems use a plurality of flux reversing cycles during each given bit cell. Such recording systems suffer from operational difficulties in data signal recovery systems as bit densities increase to high levels. Such multiple cycles result in a lower readback signal amplitude.

In addition to reduced signal amplitudes, operational difficulties in the faithful reproduction of recorded digital signals include peak shift problems, base line shift, signal bandwidth problems, loss of signal due to separation (magnetic media loses contact with the transducer), and noise, some of which may have a frequency similar to the readback signal frequency.

Peak shift, when applied to a readback signal, indicates an effective shift of the recording cell boundaries. In the readback signal, a peak shift also appears as a longer duration recorded pulse or signal than was actually recorded. It is believed such peak shift of certain signals is caused by the so-called high frequency rolling off in the readback transducer within the operating bandwidth of the data recording system. Irrespective of the cause of such peak shift, it is a problem in the faithful reproduction of recorded digital signals. Therefore, it is desirable to have a signal recovery system that is tolerant of peak shift of readback signals.

Baseline shift, on the other hand, is a DC shift or a low frequency shift in the recovery or readback signal from a given reference potential. For example, if certain digital patterns are recorded in a magnetic media, some readback systems introduce such DC component into the signal. This DC component adversely affects the faithful amplitude detection of the readback or recovered signals in that the DC component supplies a false indication of AC amplitudes representing the recorded data signals to be recovered. Such phenomenon is well known and will not be further described for that reason. In high density recordings, because of reduced AC amplitudes in the readback signal, such base line shift should be substantially eliminated or compensated for. It is preferred to have a readback system in which the base line shift does not affect the amplitude detection of the AC components.

Some digital signal recovery circuits attempt to reconstruct the original recording signal for using such reconstructed signal as the output signal. Such systems have used differentiators, integrators, as well as signal limiters. Such devices, in changing the shape of the readback signal, increase system susceptibility to noise and may introduce noise into the readback signal by such signal shaping. It is desired to have a signal recovery system which manipulates the readback signal in a linear manner (does not distort or reshape the signal).

Other signal recovery systems have introduced one-half bit period delays and then make a comparison of the one-half bit period delayed signal with a currently readback signal. Such systems can compensate somewhat for peak shift and accentuate amplitudes of the signal peaks of the signal components in the readback signal. Such systems have not maximized the difference between signal components representative of different recorded data signals; therefore, have not maximized or optimized detection of which signal component occurred in a given bit period.

SUMMARY OF THE INVENTION

It is an object to provide a data signal recovery system for use with magnetic recording media which enables increased recording bit densities and eliminates many problems inherent with high density recording and yet provides a simple arrangement for recovery of digital signals.

A data recovery system supplies a readback signal having two signal components of harmonically related frequencies; a first component has a low frequency F, and a second component has a higher harmonically related frequency, such as 2F. The readback signal containing such signal components is delayed by one bit period which contains an integral number of cycles of the higher frequency signal component. The delayed signal is then differenced, preferably absolutely differenced (output signal is always the same polarity), with the current readback signal to produce a difference signal having large amplitudes representative of the first or lower frequency signal component and substantially zero amplitude representative of the higher frequency signal component. The difference signal is than amplitude detected to indicate the presence of the two signal components which may represent binary "0's" and "1's." The arrangement is such that the amplitude at the end of a bit period is compared with the amplitude at the beginning of the bit period. If there is a substantial difference, the first signal component is indicated and if there is an insubstantial difference, the higher frequency or second signal component is indicated.

In one embodiment, there is provided a reproducing head having two gaps spaced apart a distance equal to one bit cell on the recording media. The downstream gap provides a signal which is delayed by one bit period with respect to the signal induced across the upstream gap. The signals are then differenced to provide a comparison of the amplitude at the beginning of the bit cell with the amplitude at the end of the bit cell. The difference signal is then amplitude detected to indicate which signal component is present in a given bit cell. Clock means may be provided for identifying to the amplitude detector the transition from one bit cell to the next.

The foregoing and other objects, features, and advantages of the invention will be apparent from the following more particular description of preferred embodiments of the invention, as illustrated in the accompanying drawings.

DETAIL DESCRIPTION OF THE PREFERRED EMBODIMENTS

Figure 1:
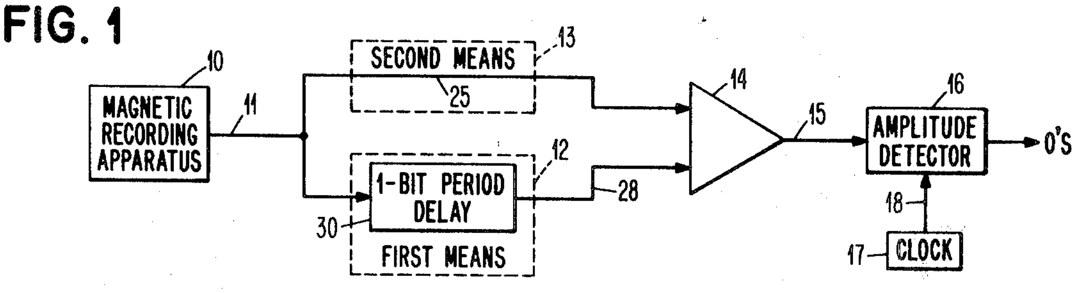
FIG. 1 is a simplified signal flow diagram of a single channel signal recovery system used to illustrate the teachings of the present invention.

FIG. 1 illustrates a single channel recovery system in accordance with the teaching of the present invention for a magnetic recording apparatus 10 which may be of usual and known construction. In a practical embodiment, plural channels would most likely be used. The readback signal from apparatus 10 is supplied over line 11 through first and second means 12 and 13 to difference amplifier 14. First means 12 delays the readback signal on line 11 by one full bit-period. Second means 13 supplies the readback signal directly to one input of difference amplifier 14. Difference amplifier 14 is then operative to make a comparison of the signal amplitude at the beginning of the given bit period with the amplitude at the end of the bit period, respectively supplied by first means 12 and second means 13, to supply a difference signal over line 15 to amplitude detector 16. Clock 17 may supply a series of clock pulses over line 18 to amplitude detector 16 for identifying the boundaries of the various bit periods, as will become more apparent. The amplitude detection occurs during each clock pulse to identify the presence or absence of binary "1's" or "0's."

Figure 2:
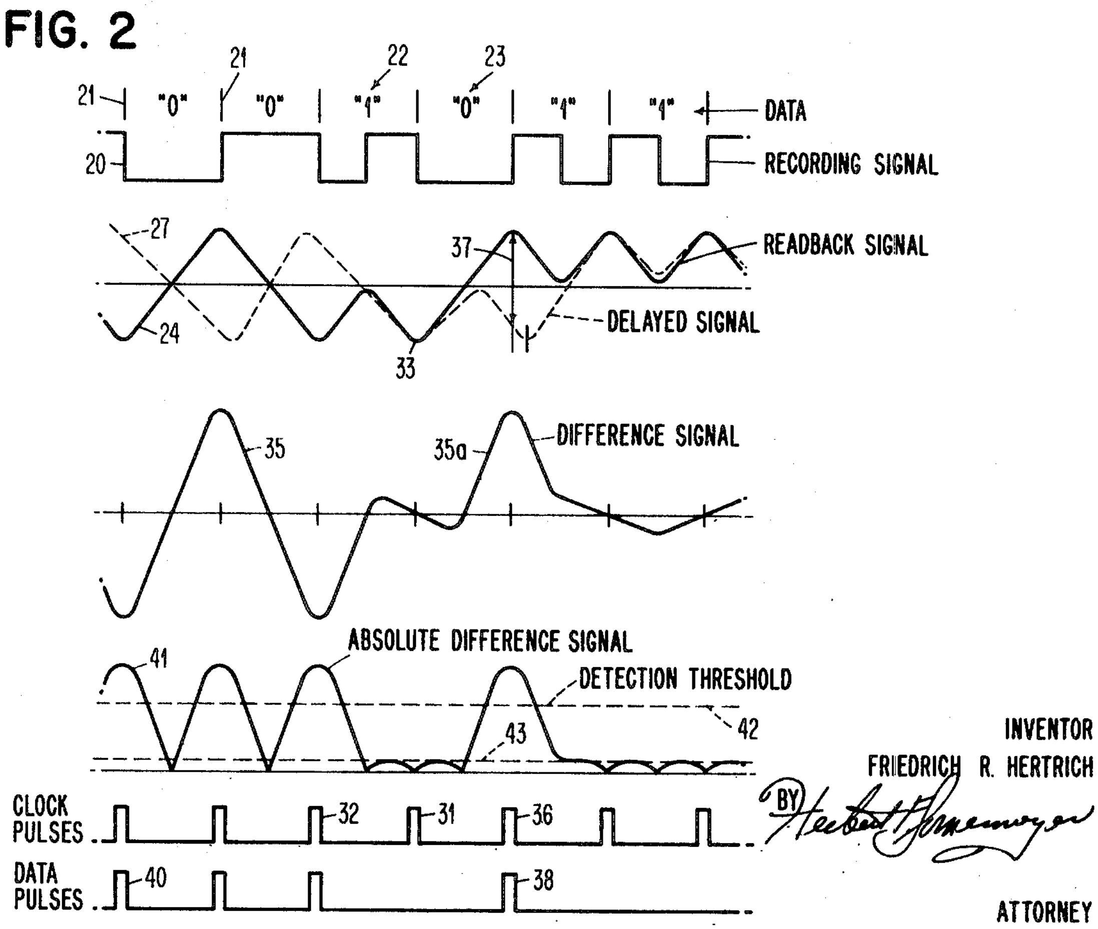
FIG. 2 is a diagrammatic representation of idealized signal waveforms used to describe the operation of the invention in the FIG. 1 embodiment.

Detailed operation of the FIG. 1 illustrated circuit is described with respect to the idealized signals illustrated in FIG. 2. The data is shown at the upper part of the figure and is recorded on a magnetic media (not shown) by a recording signal 20 used in magnetic recording apparatus 10. In the illustrated system, a bifrequency recording scheme is used wherein a lower frequency component, F, represents binary "0's," while a 2F signal component represents a binary "1." The vertical lines 21 separating the binary "1's" and "0's" in the data row represent the boundaries between adjacent bit cells in the magnetic recording media. Elapsed time for scanning a bit cell is termed a bit period. Examination of the data and the recording signal 20 shows that one complete cycle of the 2F frequency signal representing the binary "1" occurs during a given bit cell such as represented in bit period 22; whereas, for a binary "0" representation at the F frequency, only a one-half cycle occurs during a given bit period, such as during bit period 23. The readback signal supplied over line 11 is represented by the solid-line signal 24. Such signal is supplied directly by second means 13 to an input of differential amplifier 14. Second means 13 consists of a single wire or conductor 25 for transferring the readback signal on line 11 directly to differential amplifier 14. It is understood, of course, that amplification means may be provided within second means 13.

The readback signal 24 is delayed by first means 12 to produce signal 27 on line 28 and shown as the dotted line signal in FIG. 2. First means 12 may consist of a delay line 30 having a delay period equal to the bit period of magnetic recording apparatus 10.

The comparison performed by differential amplifier 14 is best understood by referring to signals 24 and 27, it being remembered that the delayed signal 27 represents the amplitude at the beginning of the bit period, while the current readback signal 24 represents the amplitude at the end of a given cell at the transition between adjacent cells indicated by the vertical lines 21. In bit period 22, a binary "1" is represented. The comparison occurs at the occurrence of a clock pulse 31 at the end of bit period 22, while clock pulse 32 represents the beginning of the bit period. At the time of occurrence of clock pulse 31, signal 24 has a negative amplitude as at 33 which is identical to the amplitude of delayed signal 27 representing the amplitude at the beginning of the bit period. Differential amplifier 14 then supplies an insubstantial signal over line 15 as represented in difference signal 35 during bit period 22. Amplitude detector 16 responsive to the insubstantial amplitude to indicate a binary "1" is recorded therein which, in the illustrated embodiment, means no output pulse is supplied.

In bit period 23, a binary "0" is recorded. The end of the bit period is represented by clock pulse 36 which corresponds to a comparison of the readback signal and the delayed signal as represented by the double-headed arrow 37. The amplitude difference between the readback signal and the delayed signal is quite substantial as represented by the large amplitude excursion 35*2* of difference signal 35. Amplitude detector 16 is responsive to the difference signal on line 15 being substantial and to clock pulse 36 to supply an output data pulse 38 indicative that a binary "0" is recorded by the low frequency signal (F) component of the recording signal 20.

Difference signal 35 is shown as having alternating large signal excursions corresponding to successively occurring binary "0" recordings. Amplitude detector 16 may be constructed such that it will detect an amplitude of either polarity to indicate a binary "0" and supply an output data pulse 40 in accordance therewith. In some recovery systems, it is desired to have amplitude detector 16 detect but a single polarity of difference signal. This simplified construction of the amplitude detector enables a varying detection threshold to be provided with a simple circuit. In accordance therewith, difference signal 35 is rectified by a rectifier (not shown) in amplitude detector 16 to construct an absolute difference signal 41 from difference signal 35. Detection threshold 42 may be an arbitrary threshold supplied by a battery, for example, or may be derived from the average signal amplitude of the readback signal appearing on line 11, or a plurality of such lines in a multichannel system. In the event of an automatically provided detection threshold, using known techniques, minimum detection threshold 43 may be provided to ensure that the higher frequency difference (2F) signal does not cause an output data pulse in detector 16 when the tape or other magnetic recording media is momentarily separated from the transducing head, as may occasionally occur. Alternately, differential amplifier 14 may be replaced by an absolute differencing circuit (i.e., effective rectification may be provided within differential amplifier 14 or equivalent) such that absolute difference signal is supplied over line 15.

While clock 17 is shown as synchronizing the amplitude detection of the difference signal 35 within detector 16, no limitation thereto is intended. Since the zero recording low frequency signal component is the only signal component that supplies a large amplitude excursion of difference signal 35, amplitude detector 16 may be made responsive to the difference signal exceeding a given threshold to supply an output signal indicative of a recovered "0." Timing information may be introduced into a control unit (not shown) wherein the number of binary "1's" may be identified.

Figure 3:
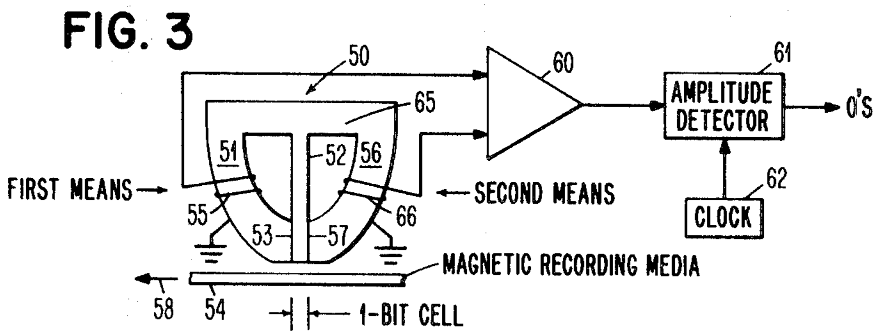
FIG. 3 is a simplified diagrammatic presentation of a second single channel embodiment of the present invention using a dual-gap reproducing head to provide delayed and current readback signals for the comparison of the signal amplitude at the beginning and end of bit cells.

FIG. 3 shows an embodiment of the present invention wherein the reproducing head effects a delay in the readback of the recorded signal such that the amplitude or flux at the beginning of a bit cell is compared with the flux at the end of the bit cell to effect a differencing of the readback signal for amplitude detection in the same inventive manner as described for the FIG. 1 illustrated embodiment. In both embodiments, the differencing action eliminates the effect of base line shift in that the difference between the two signals (i.e., the readback signal 24 and the delayed signal 27) is the sole criteria for amplitude detector 16.

In FIG. 3, a reproducing head 50 is diagrammatically illustrated as having a first arm 51 with a center arm 52 and downstream flux detecting gap 53 disposed therebetween immediately adjacent magnetic recording media 54. A coil of wire 55 is wound around first arm 51. The above-described arrangement corresponds to first means 12 of FIG. 1 in that signal 24 is supplied as an output signal. The other side of the reproducing head 50 includes a second arm 56 and center arm 52 with upstream flux detecting gap 57 disposed therebetween immediately adjacent magnetic recording media 54. The latter arrangement constitutes a second means comparable to second means 13 in that signal 27 is supplied as an output signal. Drive means (not shown) transports magnetic recording media 54 in the direction of arrow 58 past the two gaps 53 and 57. Recording head 50 is constructed such that the two gaps 53 and 57 are disposed a distance apart equal to one bit cell on magnetic recording media 54. Gap 57 is the upstream gap reproducing a signal in coil 56 corresponding to the readback signal 24 of FIG. 2. This readback signal is supplied to one input of differential amplifier 60. The downstream gap 53 reproduces the same signal one bit period later (i.e., the time it takes magnetic recording media to move from gap 57 to gap 53, the distance of one bit cell) which is delayed signal 27. The spacing between the two gaps 53 and 57 serves as a delay line in the same manner that delay line 30 delays the readback signal. The delayed signal 27 is supplied through coil 55 to another input of differential amplifier 60. Amplifier 60 then supplies difference signal 35 to amplitude detector 61 which may be clocked by clock means 62 in the same manner that detector 16 is timed or clocked.

An advantage of the FIG. 3 illustrated embodiment is that the delay is related to the physical spacing of the recording on media 54 and not determined by timing provided by a lumped delay line such as could be used for delay line 30. Therefore, if magnetic media 54 is subjected to a change in velocity past reproducing head 50, the delay is correspondingly adjusted such that the comparison of the amplitudes at the beginning and end of the bit cells are rigorously maintained. If clock 62 has a frequency derived from the velocity of the magnetic recording media past reproducing head 50, then this rigorous relationship can be easily maintained within amplitude detector 61. Such synchronization is well within one of ordinary skill in the art and will not be further described for that reason.

The construction of reproducing head 50 may be of the the thin film type. That is, center arm 52 may be constructed of one mil thick low reluctance magnetic material. Gaps 53 and 57 may be insulative material vapor deposited on opposite sides of the one mil thick low reluctance magnetic material center arm 52. Disposed on the insulative layer, a thin layer of low reluctance magnetic material may be used to construct first and second arms 51 and 56 with the return magnetic path 65 being formed in a similar manner. Windings 55 and 66 respectively on the first and second arms 51 and 56 may be of the printed circuit type, vapor deposited type, or may be a small diameter wire wound around thin low reluctance magnetic material. It is understood that reproducing head 50 should be of very small construction indicating that a very small number of turns may be used to construct the windings on the reproducing head. It is understood that, if one mil low reluctance magnetic material is used to construct center arm 52, then the magnetic recording media 54 should record 1,000 bits/inch. By going to thinner and thinner layers of low reluctance magnetic material to form the center arm, such as may be formed by sputtering or vapor deposition techniques, the bit packing density on magnetic recording media 54 may be correspondingly increased.

The present invention is applicable to those recording and recovery systems of the so-called synchronized (synced) type. Such systems are characterized by the insertion of synchronization (sync) signals adapted to cause an output pulse from the recovery system. Insertion of such synchronization or "sync" signals reduces clocking requirements and generally provides a more reliable recovery of recorded signals. Such improved performance usually enables recording at greater bit packing densities. In practicing the present invention with such shown "sync" recording systems, the low frequency component having frequency "F" would be periodically recorded as a synchronization signal. The 2F frequency signal component could (but not necessarily absolutely required) be used to phase-control the clocking channel as it can be used in other recording systems.

While the invention has been particularly shown and described with reference to preferred embodiments thereof, it will be understood by those skilled in the art that various changes in form and details may be made therein without departing from the spirit and scope of the invention.

What is claimed is:

1. A signal recovery circuit for a digital signal magnetic recording system supplying a readback signal having successive bit periods, each for one bit of data, and indicative of recorded data signals represented and having harmonically related first and second signal components, wherein said first signal component has the lower of the two frequencies, said second signal component having an integral number of cycles in each bit period, the improvement including the combination, linear differencing means having first and second differential inputs and supplying an output signal linearly representative of the difference in signal amplitudes at said inputs, first linear means responsive to said readback signal for supplying a first signal amplitude substantially linearly related to the amplitude of said readback signal, second linear means responsive to said readback signal for supplying a second signal amplitude substantially linearly related to the amplitude of said readback signal, but delayed by one bit period with respect to said first signal amplitude, such that said differencing means supplies said output signal at least being representative of the difference in amplitude of said readback signal at the beginning and end of said bit periods, and detection means receiving said output signal for amplitude detecting same to indicate which of said signal components occurred during a given bit period.

2. The circuit of claim 1, further including clocking means for supplying successively occurring clock pulses of short duration in timed relation to said readback signal for defining the beginning and ends of said bit periods, and said detection means being enabled to be responsive to said output signal only during occurrence of said clock pulses.

3. A data recovery system for recovering data signals recorded in a magnetic media and for converting same to digital electrical signals indicative of such recorded data signals, one bit of digital data being readable from said magnetic media in one bit period, the improvement including the combination:

linear signal translation means including transducer means for being operatively associated with said magnetic media for generating first and second readback signals from said magnetic media, each said readback signal having first and second harmonically related signal components and shifts therebetween representative of said recorded data signals, said first readback signal having a continuous predetermined phase delay relationship to said second readback signal in accordance with duration of one of said bit periods;

linear signal processing means receiving said first and second readback signals for linearly differentially comparing same and including linear means responsive to said differential comparison for producing a third signal substantially consisting of undulations based upon only one of said signal components and all undulations thereof being of the same signal polarity with respect to a given reference potential;

clock means supplying gate pulses in timed relation to said undulations;

signal detection means receiving said third signal, said gate pulses, and establishing a voltage amplitude threshold for supplying output data pulses upon the coincidence of said third signal exceeding said voltage reference threshold during the receipt of a gate pulse.

4. The system of claim 3, wherein said transducer means includes a reproducing transducer having a pair of recorded signal recovering gaps spaced apart by one bit cell, one of said gaps being for detecting magnetic flux one bit period after the other, and first and second winding means in said reproducing transducer respectively associated with said recorded signal recovering gaps and for respectively supplying said first and second readback signals to said linear signal processing means.

5. The system of claim 3, wherein said linear signal translation means includes a linear amplifier receiving an initial readback signal from said transducer means for supplying said first readback signal, and linear signal delay means receiving said first readback signal and operative to supply said second readback signal one bit period after said first readback signal.

6. A signal recovery circuit for a magnetic recording system having a relatively moving magnetic media recording data in bit cells each scannable in a bit period, for recovering recorded digital data signals as a readback signal having successive bit periods each for one bit of data and indicative of recorded data signals represented and having harmonically related first and second signal components wherein said first signal component has the lower of the two frequencies, said second signal component having an integral number of cycles in a bit period and said first signal component having a nonintegral number of cycles in a bit period, only one of said signal components occurring in a given bit period, the improvement including the combination, clock means supplying successive first and second clock signals of short duration respectively indicative of the beginning and end of said given bit period, first and second means responsive to said readback signal to supply electrical signals having an amplitude substantially linearly related to the amplitude of said readback signal respectively during said first and second clock signals, differencing means receiving said electrical signals from said first and second means and jointly responsive thereto to supply a difference signal during occurrence of said second clock signal having a substantial amplitude only when said first signal component is present, and an insubstantial amplitude only when said second signal component is present in said given bit period.

7. Signal recovery for a digital signal magnetic recording system which supplies a readback signal having successive bit periods and being indicative of binary data signals in that it has harmonically related first and second signal components respectively indicative of two signal states, said first signal component having the lower of the two frequencies while the second signal component has an integral number of cycles occurring in each bit period, improved signal recovery including the following steps in combination:

obtaining the signal amplitudes at the beginning and end of a given bit period, linearly comparing said obtained amplitudes and indicating said first signal component when the amplitude difference is substantial and indicating the second signal component when amplitude difference is not substantial.

8. Signal recovery, as set forth in claim 7, wherein the readback signal is delayed by one of said bit periods and then amplitude compared with the current readback signal amplitude, and defining said bit period boundaries by the peaks in the readback signal portion from said first signal component.

9. A data recovery system for recovering data signals recorded on a magnetic media and for converting signals read back from the media to digital electrical signals indicative of such recorded data, said signals being readable from said magnetic media in successive bit period intervals, the improvement including the combination:

linear signal translation means including transducer means for being operatively associated with the magnetic media for generating first and second readback signals from said magnetic media, each said readback signal having first and second harmonically related signal components and shifts therebetween representative of data, said first readback signal having a continuous predetermined phase delay relationship to said second readback signal in accordance with the duration of said successive bit periods, linear signal processing means receiving said first and second readback signals and linearly differentially comparing same and supplying an output signal having one of said harmonically signal components accentuated and a second one of said harmonically related signal components substantially eliminated, and amplitude detection means responsive to said third signal for indicating when the third signal exceeds a predetermined amplitude threshold indicative of a predetermined data content in an associated bit period.